United States Patent [19]

Harter et al.

[11] Patent Number: 4,601,237
[45] Date of Patent: Jul. 22, 1986

[54] ADJUSTABLE MEAT PRESS FOR TWO-SIDED COOKING

[75] Inventors: David W. Harter, Corydon, Ind.; Joseph R. van Bogaert, Louisville, Ky.

[73] Assignee: Vulcan-Hart Corporation, Louisville, Ky.

[21] Appl. No.: 755,336

[22] Filed: Jul. 16, 1985

[51] Int. Cl.⁴ .............................................. A47J 37/06
[52] U.S. Cl. ...................................... 99/349; 99/374; 99/379
[58] Field of Search ................. 99/349, 372, 374, 379, 99/380; 100/257; 426/523

[56] References Cited

U.S. PATENT DOCUMENTS

| | | |
|---|---|---|
| Re. 17,114 | 10/1928 | Chandler. |
| 992,417 | 5/1911 | Gale. |
| 1,661,294 | 3/1928 | Lemaster. |
| 1,697,754 | 1/1929 | Chandler. |
| 1,722,224 | 7/1929 | Jolly. |
| 1,891,825 | 12/1932 | Martell et al. |
| 2,009,791 | 7/1935 | Shroyer. |
| 2,033,067 | 3/1936 | Fromknecht. |
| 4,088,067 | 5/1978 | Kaebitzsch et al. |
| 4,165,682 | 8/1979 | Weiss. |
| 4,336,008 | 6/1982 | Pesch ........................... 100/257 X |
| 4,483,239 | 11/1984 | Mueller et al. |

Primary Examiner—Billy J. Wilhite
Attorney, Agent, or Firm—Laubscher & Laubscher

[57] ABSTRACT

An adjustable meat press for two-sided cooking of food products is disclosed, characterized by a movable cooking device having a planar heated cooking surface which is connected with a grill having a fixed heated cooking surface for pivotal movement between open and closed positions. The movable cooking device includes a plurality of incrementally adjustable cams having a camming surface which protrudes beyond the cooking surface of the movable device to space the movable cooking surface from the grill cooking surface by a selected distance. Owing to the provision of a plurality of cams, the movable cooking surface is accurately maintained parallel to the grill cooking surface when the movable device is in its closed position to uniformly press and cook one or more food products arranged therebetween. A unique spring and slide mechanism controls the movement of the movable cooking device relative to the grill between the open and closed positions.

11 Claims, 9 Drawing Figures

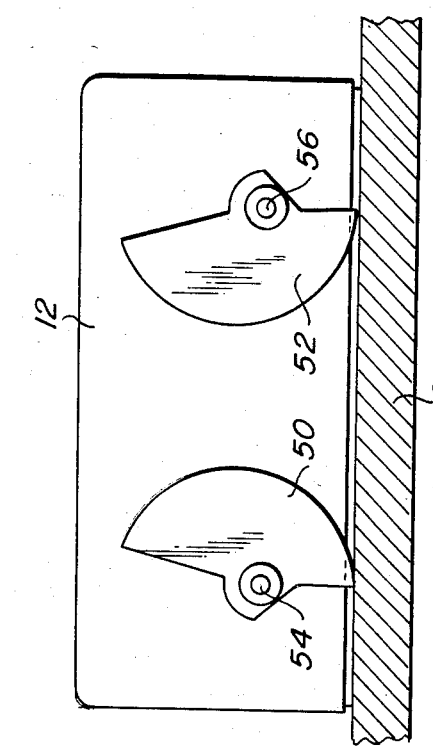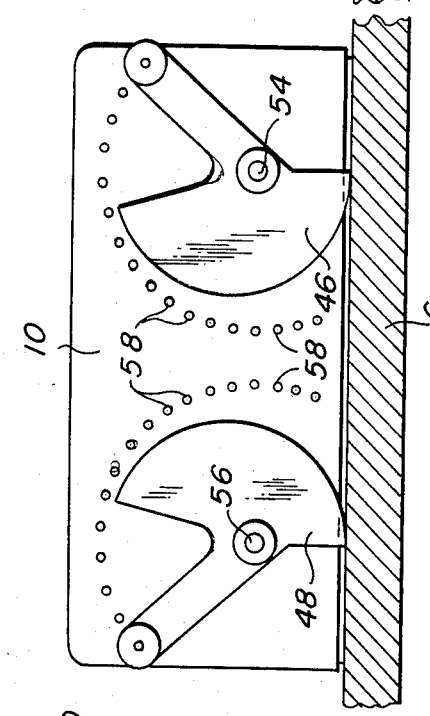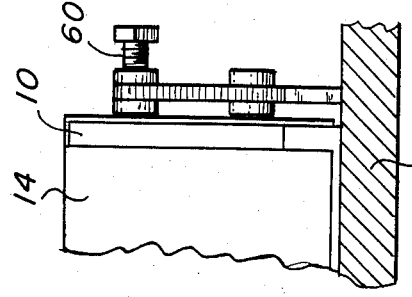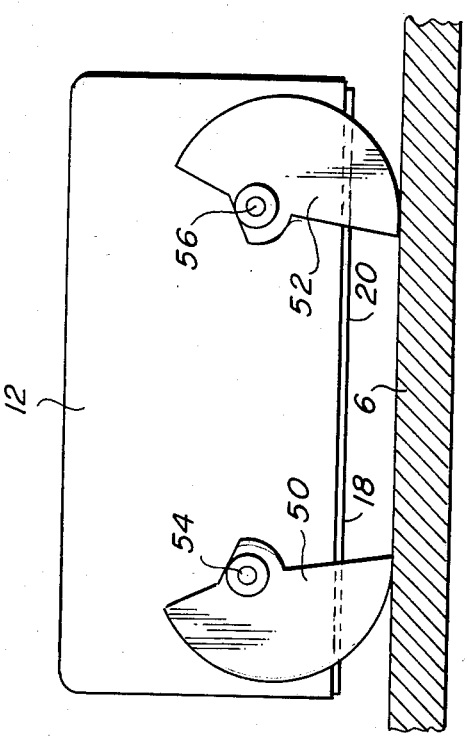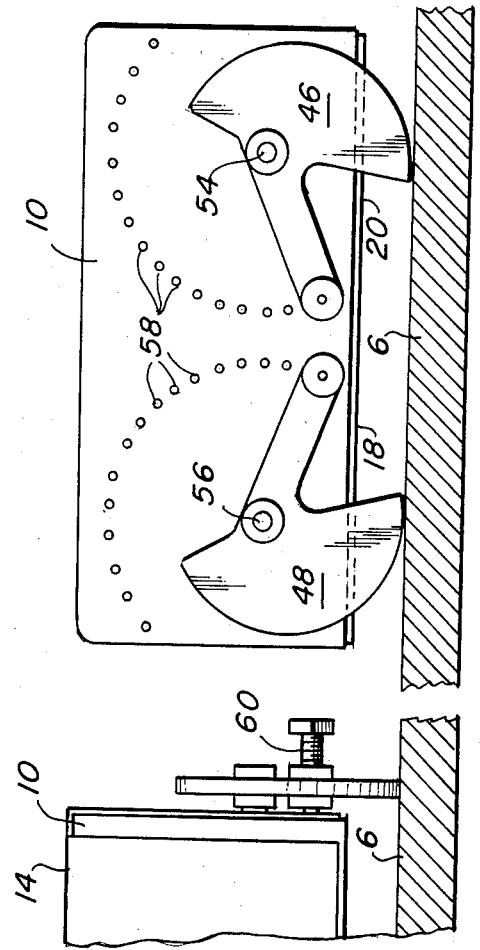

4,601,237

ADJUSTABLE MEAT PRESS FOR TWO-SIDED COOKING

BACKGROUND OF THE INVENTION

Conventional cooking of food products such as hamburgers, ham slices, bacon, sandwiches and the like is performed by placing the product on the grill and cooking one side of the product and then flipping it to cook the other side.

The present invention relates to an improved grill for simultaneously cooking a food product from both sides while compressing the product to a selected degree in order to remove fats and the like from the product during cooking and in order to reduce the cooking time.

BRIEF DESCRIPTION OF THE PRIOR ART

Two-sided cooking devices are well-known in the patented prior art. The U.S. patents to Chandler U.S. Pat. No. Re. 17,114, Lemaster U.S. Pat. No. 1,661,294, Chandler U.S. Pat. No. 1,697,754, Jolly U.S. Pat. No. 1,722,224, Martell et al U.S. Pat. No. 1,891,825, and Fromknecht U.S. Pat. No. 2,033,067, for example, disclose two-sided cooking devices wherein the spacing between upper and lower cooking surfaces is adjustable.

While the prior devices defined in the above patents normally operate satisfactorily, they each possess an inherent drawback relating to the positioning of the upper or movable heating surface relative to the lower or fixed heating surface. More particularly, the previous devices are not able to provide even cooking of a food product since it is difficult, if not impossible, to maintain the movable cooking surfaces of the prior devices parallel to the fixed lower cooking surface. Accordingly, where a plurality of hamburgers of the same thickness, for example, are to be cooked simultaneously between the fixed and movable cooking surfaces, some of the hamburgers are overcooked while others are undercooked since the upper cooking surface does not uniformly contact the upper surface of each hamburger.

Numerous attempts have been made to overcome this drawback. One such attempt is disclosed in the recently issued U.S. patent to Mueller et al U.S. Pat. No. 4,483,239 which discloses an adaptor for converting a conventional grill for two-sided cooking of food products. The adaptor includes three separate adjusting mechanisms to vary the spacing between the grill cooking surface and the cooking platen of the adaptor. One adjustment is provided at the connection between the platen and the frame of the adaptor. A second adjustment is provided in the form of an eccentric at the front free edge of the platen. Finally, a third adjustment is provided to compensate for warpage of the platen. In addition to adjusting the spacing between the cooking surfaces, the platen can apply pressure to the food product to limit shrinkage and curling.

The Mueller et al device, while an improvement over the earlier two-sided cooking devices, suffers from the same drawbacks relating to maintaining the upper or movable cooking surface parallel to the lower surface since the upper platen is supported only at one point, i.e. at the front edge, relative to the surface of the grill. Lateral instability of the upper platen renders the device less effective for cooking a plurality of food products simultaneously.

A further drawback of all of the prior devices is that there is little control of the movement of the movable cooking platen or member between open and closed positions. In commercial restaurants where a quantity of similar products are to be cooked simultaneously, the movable heating device is quite large, bulky, and heavy. If the person grilling the food products is not careful, when the movable platen is brought to the closed position, the platen might unintentionaly strike and damage the cooking surface of the grill. Furthermore, when lifting the movable cooking platen, the rear edge thereof often rubs against the cooking surface of the grill causing further damage. Finally, careless movement of the movable platen results in splashing of grease, fats and the like which not only burn the person operating the grill but also is difficult to clean up.

The present invention was developed in order to overcome these and other drawbacks of the prior devices by providing an improved two-sided cooking device wherein movable and fixed cooking surfaces are maintained parallel and accurately spaced when in the closed cooking position, and wherein the movement of the movable cooking device or platen is controlled to prevent injury to the operator or damage to the grill.

SUMMARY OF THE INVENTION

Accordingly, it is a primary object of the present invention to provide a two-sided cooking device wherein a movable cooking device or platen having a planar heated cooking surface cooperates with a grill having a fixed, planar, generally horizontal cookng surface for simultaneously cooking both sides of a food product such as meat and the like. A controlled pivotal connection is provided between the movable cooking platen and the grill, whereby the movable platen is pivotable between a closed position wherein the movable cooking surface is spaced from and parallel to the fixed cooking surface and an open position wherein the movable cooking surface is arranged at an angle relative to the fixed cooking surface. A plurality of incrementally adjustable cams are connected with the peripheral edges of the movable cooking platen to control the spacing between the movable and fixed cooking surfaces when the movable platen is in the closed cooking position. Accordingly, when a food product of a given thickness is placed on the fixed cooking surface of the grill and the platen is pivoted to the closed position with the cams resting on the fixed cooking surface, the cams are adjusted to maintain the movable surface parallel to and spaced from the fixed surface by a distance corresponding with the thickness of the food product, thereby to compress the food product during cooking from opposite sides.

According to a more specific object of the invention, the movable cooking device has a generally rectangular configuration with a cam being adjustably rotatably connected with each of the corners thereof. The front cam on each side of the platen is interconnected with the rear cam on the same side by a rod, whereby the cams of each interconnected pair are simultaneously adjusted to protrude a desired amount beyond the plane containing the cooking surface of the movable platen.

According to another object of the invention, the pivotal connection between the grill and the movable platen comprises a tubular rocker arm, a spring and linkage combination, and a lifting device. The rocker arm is rotatably connected at its ends with the grill for rotation about a horizontal axis. The lifting device is connected with the rocker arm and extends in front of the movable platen with an intermediate portion of the lift device being connected with the movable platen. Thus when the lift device is raised to pivot the platen from its closed to its open position, the rocker arm rotates. One end of the linkage is connected with the rocker arm for vertical displacement in accordance with rotation of the rocker arm. The other end of the linkage is slidably connected with the grill via a sliding bracket assembly. The spring is connected at one end with the grill and at the other end with the sliding bracket assembly to control displacement of the linkage and thus pivotal movement of the movable platen.

It is another object of the invention to provide adjustable stops in the sliding bracket assembly to limit the slidable displacement of the linkage, thereby to limit movement of the movable platen toward its open position.

It is yet another object of the invention to provide a coating of fluorocarbon material on the cooking surface of the platen to prevent food products from sticking thereto.

BRIEF DESCRIPTION OF THE FIGURES

Other objects and advantages of the subject invention will become apparent from a study of the following specification when viewed in the light of the accompanying drawing in which:

FIGS. 3a–3c are front, rear, and side views, respectively, of the adjustable cams illustrating the movable cooking device in its lowest position;

FIGS. 4a–4c are front, rear, and side views, respectively, of the adjustable cams illustrating the movable cooking device in its highest position.

DETAILED DESCRIPTION

Figure 1:
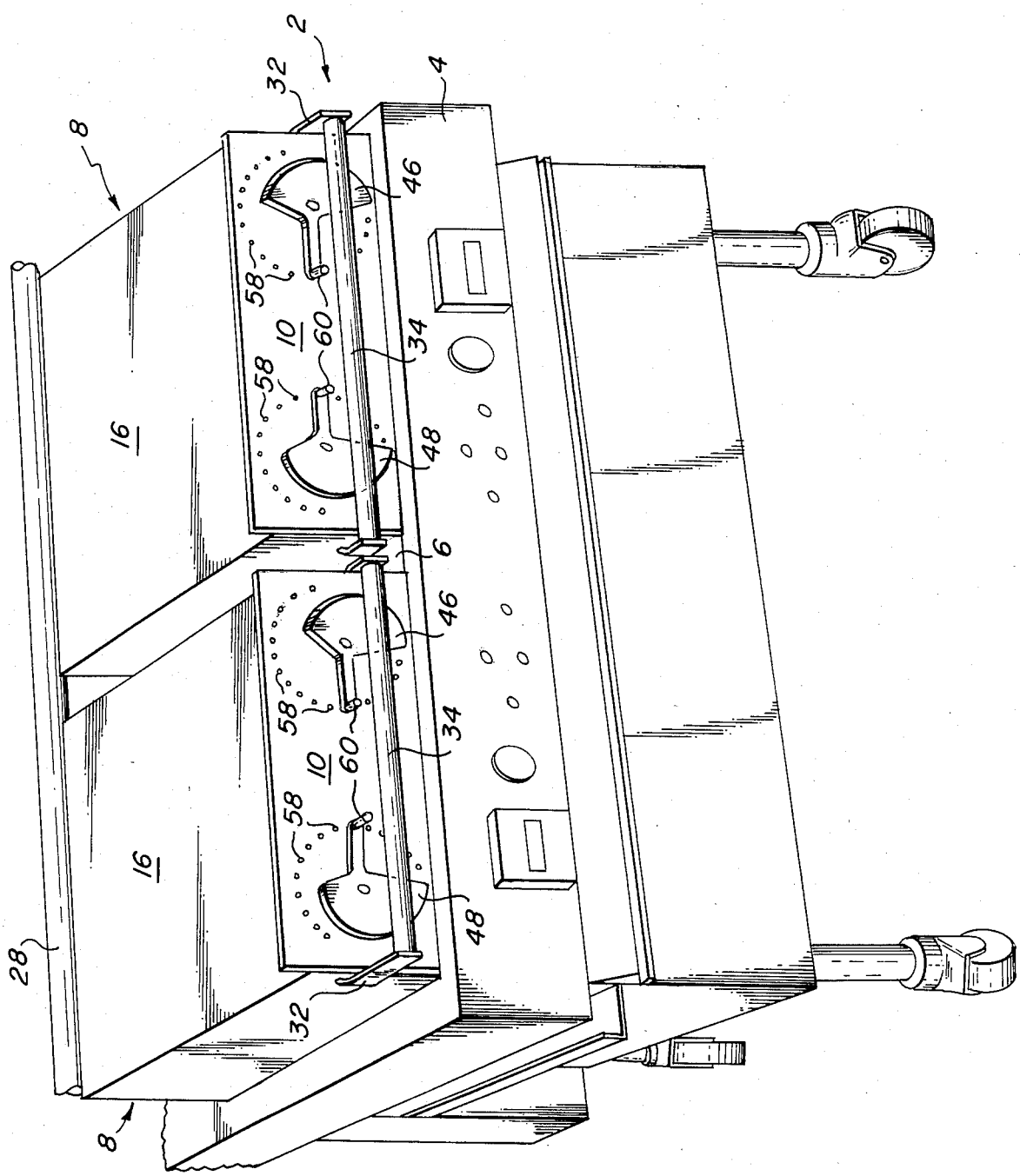
FIG. 1 is a perspective view of the adjustable meat press for two-sided cooking according to the invention.

As shown in FIG. 1, the invention relates to a device 2 for two-sided cooking and simultaneous compression of food products such as hamburgers, bacon, ham slices, sandwiches and the like. The device includes a lower grill 4 having a fixed, planar, generally horizontal, heated cooking surface 6 formed of stainless steel or the like upon which the food product is placed. The grill surface may be heated by gas burners or electric resistance heaters (not shown) in a conventional manner.

The grill is provided with at least one movable cooking device platen 8 which is connected with the rear portion of the grill 4 for pivotal movement relative thereto as will be discussed in greater detail below.

Figure 2:
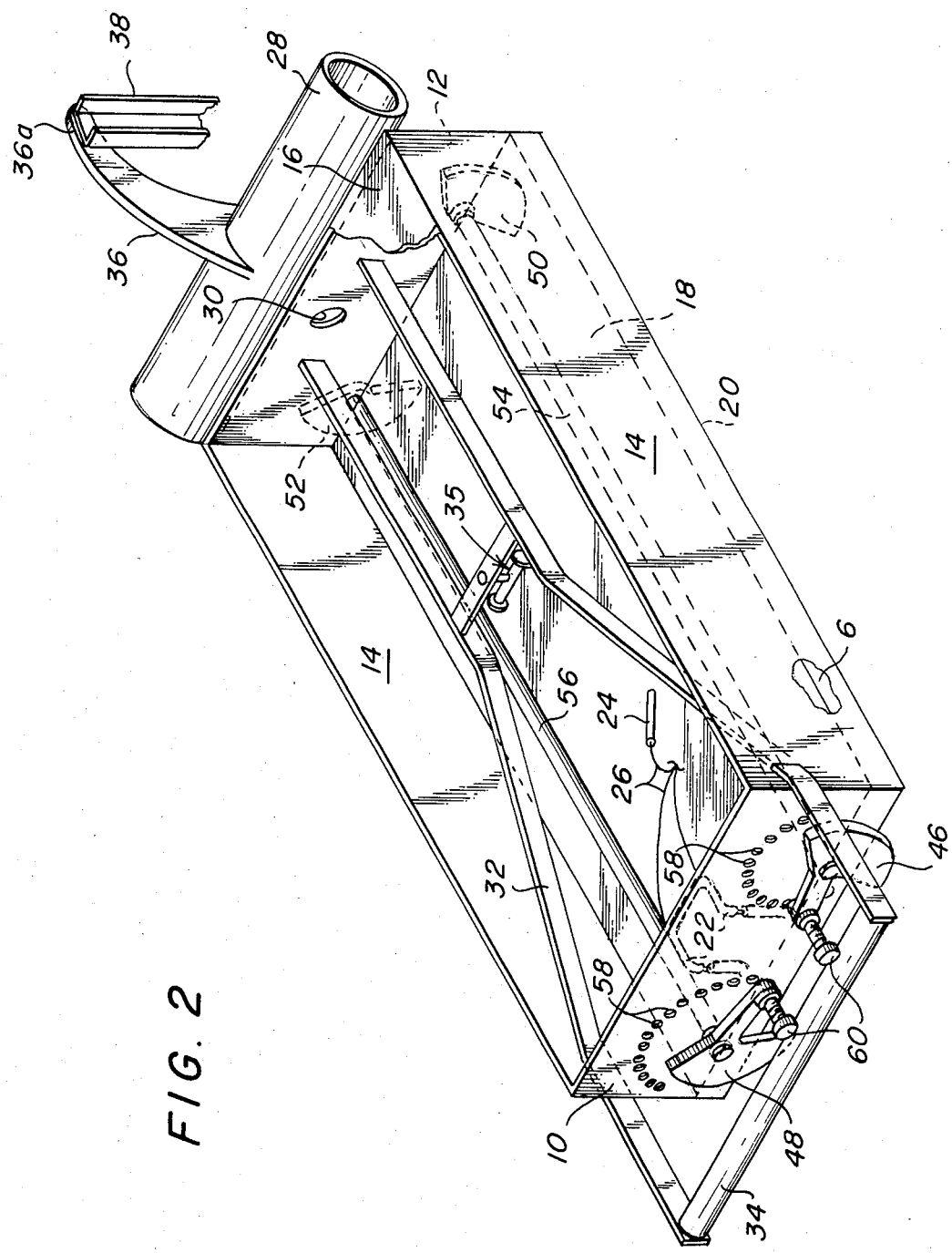
FIG. 2 is a perspective view of the upper movable cooking platen.

Referring now to FIG. 2, the movable cooking device 8 is shown in greater detail. The device is preferably formed in a rectangular configuration from sheet metal or the like and includes a front index plate 10, rear 12, side 14, and the top 16 walls, and a platen 18. The side, top, and rear walls define a cover for the platen 18 and index plate 10. As shown in FIG. 2 (with the top wall cut away) the walls of the movable cooking device define a hollow chamber. The platen 18 has a planar configuration and comprises a movable cooking surface 20 of the device for two-sided cooking of the food product as will be developed in greater detail below. The platen 18 is preferably formed of heat conducting metal such as aluminum and is coated with a layer of fluorocarbon material such as TEFLON ® non-stick coating material to prevent the food product from sticking thereto during cooking.

The top wall 16 of the movable cooking device 8 is removably connected with the front, side, and rear walls by any suitable means such as screws (not shown) to afford access to the interior of the device. Arranged within the interior of the device 8 are heating elements 22 for heating the platen 18 and thus the movable cooking surface 20. The heating elements may comprise conventional electrical resistance heating devices, two of which are shown in the drawing. Alternatively, a resistance heater may be embedded in the platen. A temperature sensor 24 is also arranged in the interior of the movable cooking device to thermostatically control the temperature of the platen 18 in a conventional manner. The wiring 26 for both the heaters and the sensor passes through from within the movable cooking device 8 to an exterior power supply and thermostat control (not shown).

As noted above, the movable cooking device 8 is pivotably connected with the grill 4. The platen is thus movable between a closed cooking position wherein the cooking surface 20 of the platen is arranged parallel to and spaced from the fixed cooking surface 6 of the grill as shown in FIG. 1, and an open position wherein the movable surface 20 is angularly arranged relative to the fixed surface 6. When in the open position, the movable surface 20 is preferably arranged at an acute angle relative to the fixed surface, although the platen may be pivoted further to define an obtuse angle between the cooking surfaces where, for example, it is desired to clean the movable cooking surface 20.

Figure 5:
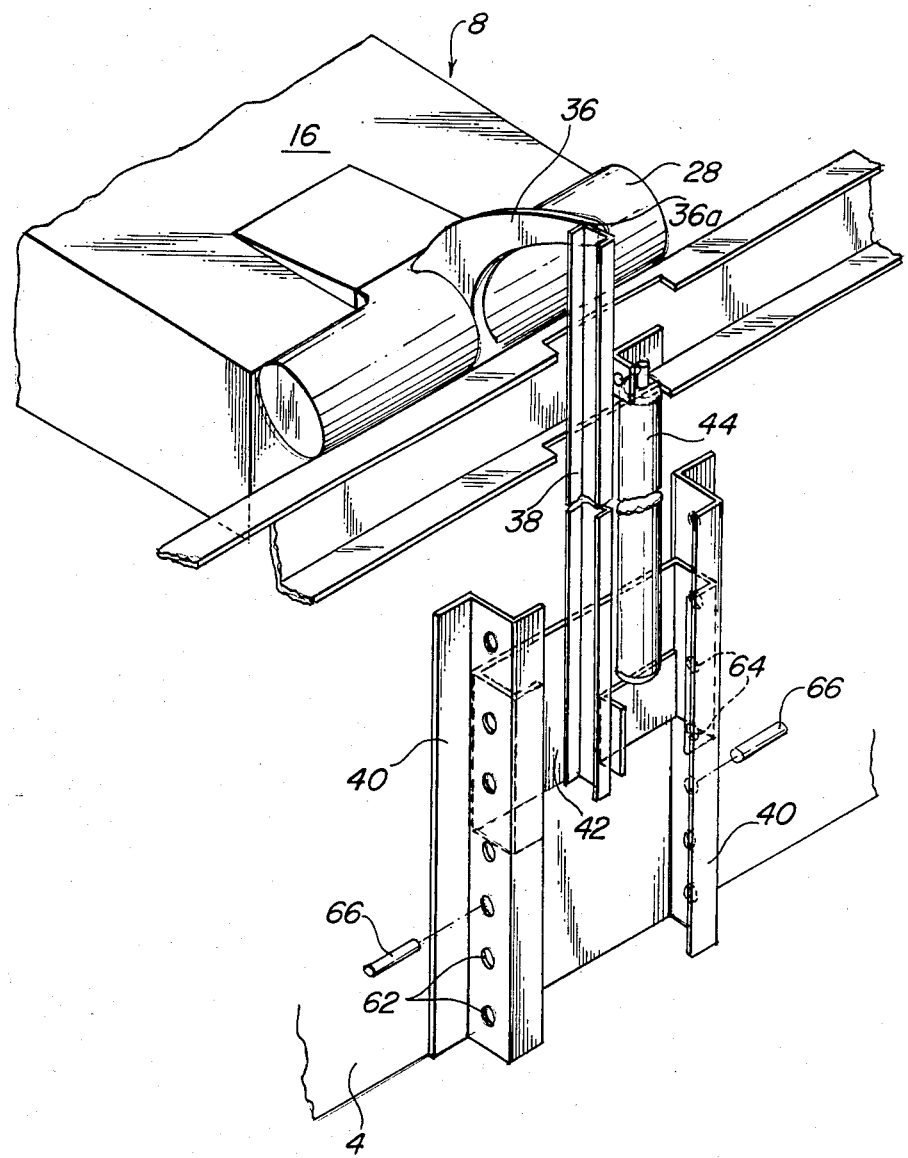
FIG. 5 is a partial perspective view illustrating the pivotal connection of the movable cooking device with the grill.

The pivotal connection between the grill 4 and the movable cooking device 8 is shown in FIGS. 2 and 5. A longitudinal tubular rocker arm 28 is rotatably connected with the grill by any suitable means such as bearings (not shown). The shaft is also formed of stainless steel and contains an opening 30 to receive the wires 26 to the platen heaters and sensor. A platen lift mechanism includes a lift arm 32 which is connected at its rear end with the rocker arm 28 and extends forwardly from rocker arm through the top rear wall 12 of the movable cooking device 8 and outwardly beyond the front index plate 10 of the movable device. A handle 34 is connected with the arm 32 and extends across the front index plate 10 of the device. Intermediate its ends, the lift arm is connected with the platen. More particularly, a spherical pivot 35 is mounted on the upper surface of the platen 18 and the arm 32 is connected with the pivot in a conventional manner, whereby a limited amount of play is provided between the platen 18 and the arm 32. Accordingly, when the lift handle is raised relative to the grill, the rocker arm 28 rotates about a horizontal axis and the platen 18 is pivoted away from the grill to its open position.

The rocker arm 28 is formed with an upwardly and rearwardly extending wing portion 36, the end extremity 36a of which moves up and down with rotation of the rocker arm in opposite directions. A vertically arranged linkage 38 is connected at its upper end with the extremity 36a of the rocker arm wing portion for vertical displacement with rotation of the rocker arm. At the rear of the grill 4, as shown in FIG. 5, a pair of brackets 40 are connected with the grill. A slide member 42 is slidably connected with the brackets for vertical displacement relative thereto. The lower end of the linkage is connected with the slide member by any suitable means. A spring mechanism 44 such as a gas spring is connected at its upper end with the grill and at its lower end with the slide member 42. The spring 44 controls the displacement of the slide member relative to the brackets 40 to provide a uniform acceleration and velocity of the slide member. Controlled displacement of the slide member 42 thus controls movement of the linkage 38 and rotation of the rocker arm 28 to control the pivotal movement of the platen 18 relative to the grill 4.

An important feature of the invention is the provision of adjustable spacing devices for controlling the spacing of the cooking surface 20 of the movable platen 18 from the fixed cooking surface 6 of the grill 4 when the platen is in its closed position.

Referring to FIG. 2, the movable cooking device includes a plurality of stainless steel cams of similar eccentricity connected with the peripheral edge thereof. More particularly, two cams 46, 48 are rotatably connected with the opposite ends of the front index plate 10 as shown in FIGS. 3a and 4a. Similarly, two cams 50, 52 are rotatably connected with the opposite ends of the rear wall 12. A first longitudinal rod 54 passes through the front cam 46, the front index plate 10, the rear wall 12, and the rear cam 50 to interconnect the cams 46 and 50 and to rotatably connect these cams with their respective walls. Owing to the interconnection of the cams 46 and 50, they rotate together by the same degree of rotation. A second longitudinal rod 56 interconnects the cams 48 and 52 in a similar manner.

The front index plate 10 contains two sets of arcuately spaced openings 58 arranged adjacent the cams 46 and 48 as shown in FIGS. 2, 3a, and 4a. The front cams 46 and 48 each contain a projection portion 46a, 48a having a spring-biased detent 60 connected therewith. As shown in FIGS. 3c and 4c, each detent 60 is operable to engage a selected opening 58 in the front index plate.

All of the cams protrude beyond the plane containng the platen 18, whereby when the platen is in the closed position, the cams rest on the surface 6 of the grill 4 to space the platen cooking surface 20 from the fixed cooking surface 6. In FIGS. 3a-c, the movable cooking device 8 is shown in its lowest position, i.e. closest to the cooking surface 6 of the grill. With the detents 60 disengaged from the openings 58, the front cams are rotated to a selected position with the cams protruding a greater amount below the platen. When the selected position is reached, the detents 60 are released to engage the openng associated with the selected position. In FIGS. 4a-c, the cams are shown in the position corresponding with the greatest spacing between the fixed and movable cooking surfaces. Owing to the interconnection aforded by the rods 54 and 56, the rear cams 50, 52 are rotated and extend below the platen to a degree equal to that of the corresponding front cams.

Because the movable cooking device 8 is supported on the fixed surface 6 of the grill at four points (i.e. at the four cams), the spacing at each point of support may be accurately set, whereby the platen cooking surface 20 is maintained parallel to the fixed grill cooking surface 6 when the platen is in its closed position. The maintenance of a parallel relation between the cooking surfaces is very important for uniform cooking of one or more food products such as hamburgers of a similar thickness.

It will thus be apparent to those skilled in the art that the spacing between the cooking surfaces may be easily and accurately set by arranging the detents 60 in the openings 58 corresponding with the desired spacing. The spacing may be readily adjusted in accordance with the thickness of the food product being cooked.

Control of the spacing in relation to the thickness of the food product also controls the amount of compression applied by the platen to the food product during cooking. By controlling the degree of compression, the cooking time for the product may be controlled and shrinkage thereof may be limited.

The unique pivotal connection between the upper movable cooking device 8 and the grill affords controlled movement of the platen between its open and closed positions. This will prevent the platen from being slammed or dropped against the grill, thereby avoiding damage to the grill cooking surface. Moreover, because the lift arm is connected with the top surface of the platen remote from the ends thereof, the bottom edge of the rear wall 12 is prevented from striking or rubbing against the grill cooking surface 6.

The degree of pivotal movement of the movable device 8 relative to the grill 4 is controlled by a stop mechanism provided on the brackets 40 and the slide member 42. As shown in FIG. 5, the brackets each contain equally spaced openings 62 and the slide member contains corresponding openings 64, both of which are adapted to receive removable pins 66. By placing the pins 66 in one of the openings 62 of the brackets below the slide member, the vertical displacement of the slide is limited, thereby limiting the degree of movement of the movable device toward the open position. By placing the pins in corresponding openings in both the bracket and slide member, the slide member is prevented from moving relative to the brackets and the movable device is locked in the selected position.

The two-sided cooking device 2 may be provided as a single unit for delivery to a customer. Alternatively, a conventional cooking grill may be retrofit for two-sided cooking by connecting the movable cooking device thereto by attaching the rocker arm, the slide mechanism and the spring to the rear portion of the grill.

It is not necessary that the temperature of the movable platen cooking surface be equal to that of the grill surface. For example, the grill temperature may be on the order of 325° F. while the platen temperature is approximately 275° F. Using such a temperature differential in combination with the application of pressure during the two-sided cooking process will generally reduce the cooking times of the product by 33–50% over conventional one-sided cooking, depending on the thickness of the product being cooked.

While in accordance with the provisions of the Patent Statute the preferred form and embodiments of the invention have been illustrated and described, it will be apparent to those skilled in the art that various changes and modifications may be made without deviating from the inventive concepts set forth above.

What is claimed is:

1. Apparatus for modifying a grill having a fixed, planar, generally horizontal heated cooking surface to provide two-sided cooking of a food product such as meat and the like, comprising
  (a) a movable cooking device having a planar heated cooking surface;
  (b) means for pivotally connecting one edge wall of said movable cooking device with an edge wall of the grill, whereby said movable device is pivotable between a closed position wherein said movable cooking surface is arranged spaced from and parallel to the fixed cooking surface and an open position wherein said movable cooking surface is arranged at an angle relative to the fixed cooking surface; and (c) incrementally adjustable spacing means connected with said movable cooking device for controlling the spacing between said movable and fixed cooking surfaces when said movable device is in the closed cooking position, said spacing means comprising a plurality of spacing members arranged about the peripheral edge of said movable device in interconnected pairs, said members of each pair being arranged at opposite edges of said movable device, whereby when a food product of a given thickness is placed on the fixed cooking surface of the grill and said movable device is pivoted to the closed position with said spacing members resting on the fixed cooking surface, said spacing means are adjusted to maintain said movable surface parallel to and spaced from said fixed surface by a distance corresponding with the thickness of the food product, thereby to compress the food while cooking the product from opposite sides.

2. Apparatus as defined in claim 1, wherein said movable device has a hollow generally rectangular configuration including front, rear, side and top walls and a bottom platen, said platen comprising said heated cooking surface, and further wherein said members of each pair of spacing members are connected with said front and rear walls, respectively, of said movable device.

3. Apparatus as defined in claim 2, wherein said spacing members comprise cams rotatably connected with said movable device, and further comprising a longitudinal rod for connecting the front and rear cams of each pair, said cams extending beyond the plane containing said platen in accordance with the rotation of said cams relative to said movable device.

4. Apparatus as defined in claim 3, wherein said movable device front wall comprises an index plate containing a plurality of arcuately spaced openings, and further wherein said front cams each have a spring-biased detent mounted thereon and adapted for engagement with a selected one of said openings, whereby when said detent is disengaged from said opening, said pairs of cams may be rotated relative to said movable device to a selected position wherein said cams protrude beyond said platen and said detent is positioned in the opening corresponding with said selected position to adjust the spacing between said cooking surfaces when said movable device is in the closed position.

5. Apparatus as defined in claim 3, wherein said connecting means comprises (a) a tubular rocker arm rotatably connected at its ends with the grill for rotation about a horizontal axis;

(b) means connecting said movable device with said rocker arm, whereby said rocker arm rotates when said movable device pivots between its open and closed positions; and (c) linkage means connected at one end with said rocker arm and slidably connected at the other end with the grill.

6. Apparatus as defined in claim 5, wherein said connecting means further comprises spring means connected between the grill and the slidably connected end of said linkage means to control the pivotal movement of said movable device between its open and closed positions.

7. Apparatus as defined in claim 6, wherein said connecting means further comprises adjustable stop means mounted on the grill to limit the slidable displacement of said linkage means relative thereto, thereby to limit the movement of said movable device toward its open position.

8. Apparatus as defined in claim 5, wherein said means for connecting said movable device with said rocker arm comprises a lift handle connected at one end with said rocker arm, the other end of said handle extending through said movable device and beyond said front wall, said handle having an intermediate portion connected with the top surface of said platen intermediate said front and rear walls, whereby when said lift handle is lifted to pivot said movable device from its closed position to the open position, the lower edge of said rear wall is prevented from contacting the fixed cooking surface of the grill.

9. Apparatus as defined in claim 8, and further comprising spherical pivot means for connecting said handle with said platen top surface.

10. Apparatus as defined in claim 6, wherein said movable platen cooking surface includes a coating of fluorocarbon material which prevents food products from sticking thereto.

11. A grill for simultaneously cooking a food product such as meat and the like from two sides, comprising (a) a fixed cooking device including a planar, generally horizontal heated cooking surface;

(b) a tubular rocker arm rotatably connected with said cooking device for rotation about a horizontal axis;

(c) a movable cooking device connected with said rocker arm for pivotal movement relative to said fixed cooking device upon rotation of said rocker arm, said movable device having a planar heated cooking surface which is arranged spaced from and parallel to said fixed cooking surface when said movable device is in a closed position and which is arranged at an angle to said fixed cooking surface when said movable device is pivoted to an open position;

(d) linkage means having one end connected with said rocker arm and the other end slidably connected with said cooking device, said linkage means being displaced upon pivotal movement of said movable device;

(e) spring means connected between said fixed cooking device and the slidably connected end of said linkage means for controlling the pivotal movement of said movable device; and (f) cam means rotatably connected with the edges of said movable device, said cam means being incrementally adjustable relative to said movable device to extend a desired amount beyond the plane containing said movable device cooking surface, whereby when a food product of a given thickness if placed on the fixed cooking surface of the cooking device and said movable device is pivoted to the closed position with said cams resting on the fixed cooking surface, said cams are adjusted to maintain said movable surface parallel to and spaced from said fixed surface by a distance corresponding with the thickness of the food product while cooking the product from opposite sides.

* * * * *